(12) United States Patent

Kropotov et al.

(10) Patent No.: US 12,621,346 B1

(45) Date of Patent: May 5, 2026

(54) HONEYPOTS FOR DETECTING NETWORK INTRUSIONS TO COMPUTER NETWORKS OF ORGANIZATIONS

(71) Applicant: Trend Micro Incorporated, Tokyo (JP)

(72) Inventors: Vladimir Kropotov, Munich (DE); Fyodor Yarochkin, Cork (IE); Ian Kenefick, Cork (IE)

(73) Assignee: Trend Micro Incorporated, Tokyo (JP)

( * ) Notice: Subject to any disclaimer, the term of this patent is extended or adjusted under 35 U.S.C. 154(b) by 186 days.

(21) Appl. No.: 18/674,357

(22) Filed: May 24, 2024

(51) Int. Cl.
H04L 9/40 (2022.01)

(52) U.S. Cl.
CPC ...... H04L 63/1491 (2013.01); H04L 63/1416 (2013.01)

(58) Field of Classification Search
CPC ..................... H04L 63/1491; H04L 63/1416
See application file for complete search history.

(56) References Cited

U.S. PATENT DOCUMENTS

| | | | | |
|---|---|---|---|---|
| 12,184,693 | B1 * | 12/2024 | Eliav ........................ | H04L 63/20 |
| 2019/0132359 | A1 * | 5/2019 | Kraenzel ............. | H04L 63/1491 |
| 2022/0294822 | A1 * | 9/2022 | Shmelev ............. | H04L 63/1491 |
| 2024/0333765 | A1 * | 10/2024 | McGrew ............. | G06F 11/3476 |
| 2025/0039235 | A1 * | 1/2025 | Hanes ................. | H04L 63/1416 |

OTHER PUBLICATIONS

Daniel Fraunholz, Simon Duque Anton, Christoph Lipps, Daniel Reti, Daniel Krohmer, Frederic Phol, Matthias Tammen, and Hans Dieter Schotten, "Demystifying Deception Technology: A Survey", Intelligent Networks Research Group German Research Center for Artificial Intelligence and Institute for Wireless Communication and Navigation University of Kaiserslautern Kaiserslautern, Apr. 17, 2018, Downloaded Jan. 5, 2024.
Daniel Fraunholz, Marc Zimmermann, and Hans D. Schotten, "An Adaptive Honeypot Configuration, Deployment and Maintenance Strategy", Intelligent Networks Research Group, German Research Centre for Artificial Intelligence, Downloaded Jan. 5, 2024.
Iyad Kuwatly, Malek Sraj, and Zaid Al Masri, "A Dynamic Honeypot Design for Intrusion Detection", American University of Beirut Department of Electrical and Computer Engineering, Downloaded Jan. 5, 2024.
Wira Zanoramy Ansiry Zakaria and Miss Laiha Mat Kiah, A review of dynamic and intelligent honeypots, ScienceAsia, https://www.scienceasia.org/2013.39S.n1/scias39S_1.pdf, 2013, Downloaded Jan. 5, 2024.
"YAML", Wikipedia, https://en.wikipedia.org/wiki/YAML, Downloaded Feb. 13, 2024.

* cited by examiner

*Primary Examiner* — Nicholas P Celani
(74) *Attorney, Agent, or Firm* — Beyer Law Group LLP

(57) ABSTRACT

A computer network of an organization has network assets and honeypots. Probes are deployed on the computer network to collect telemetry data of the network assets. Asset profiles of the network assets are extracted from the telemetry data to obtain organization-specific data. A prompt is generated, with the prompt including an instruction to generate a honeypot configuration based on the organization-specific data. The prompt is input to a generative artificial intelligence (AI) model, such as a large language model (LLM). A honeypot is configured in accordance with the honeypot configuration that is output by the generative AI model responsive to the prompt.

20 Claims, 10 Drawing Sheets

Prompt     *160*

"From this text, extract hostnames, IP addresses, domain names, usernames, file paths, and other additional parameters you recognise, list them in yaml format under each own category: <u><followed by the raw text data></u>"

*161*

Figure 4:
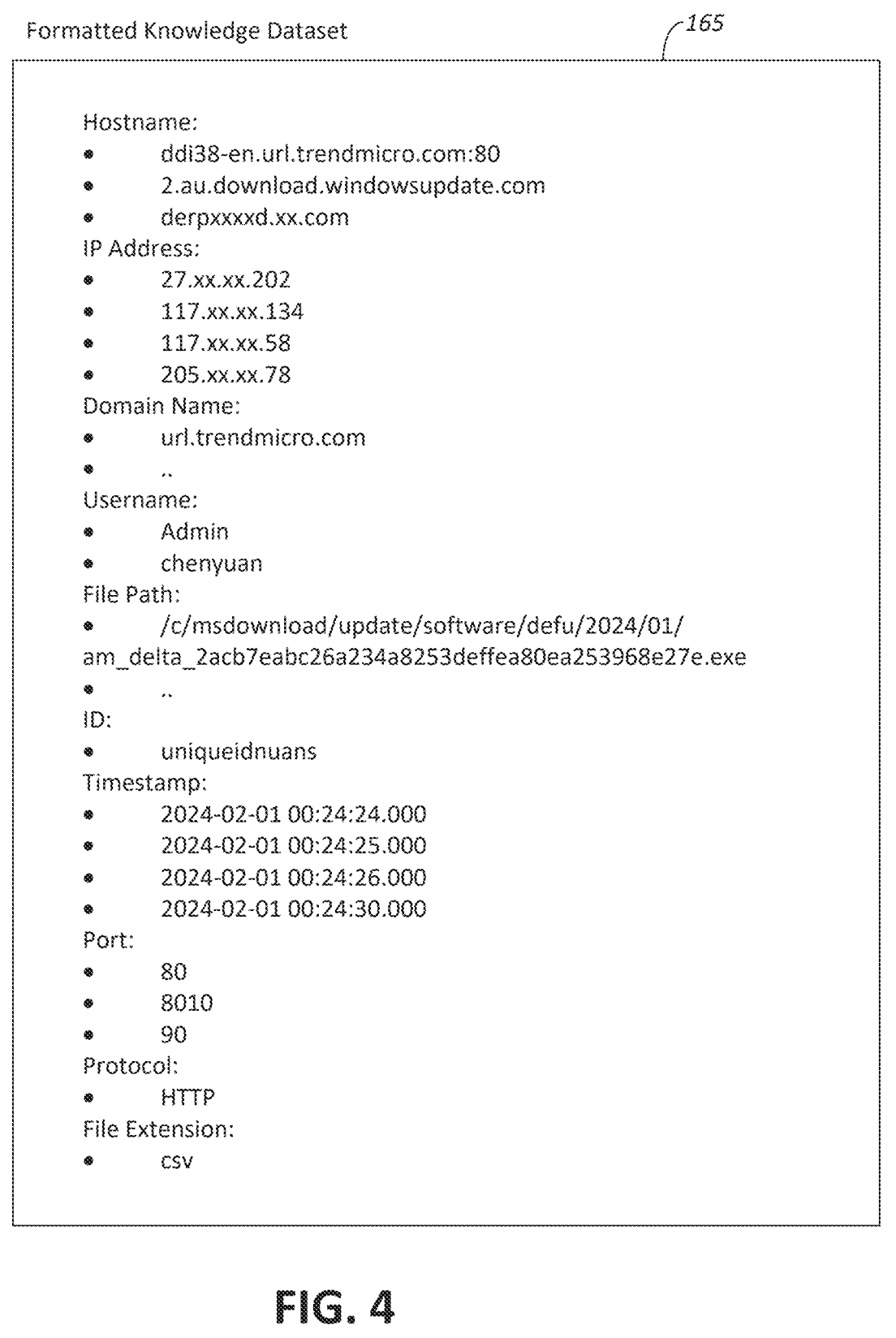

Formatted Knowledge Dataset     ⟋165

Hostname:
- ddi38-en.url.trendmicro.com:80
- 2.au.download.windowsupdate.com
- derpxxxxd.xx.com IP Address:
- 27.xx.xx.202
- 117.xx.xx.134
- 117.xx.xx.58
- 205.xx.xx.78

Domain Name:
- url.trendmicro.com
- ..

Username:
- Admin
- chenyuan

File Path:
- /c/msdownload/update/software/defu/2024/01/ am_delta_2acb7eabc26a234a8253deffea80ea253968e27e.exe
- ..

ID:
- uniqueidnuans

Timestamp:
- 2024-02-01 00:24:24.000
- 2024-02-01 00:24:25.000
- 2024-02-01 00:24:26.000
- 2024-02-01 00:24:30.000

Port:
- 80
- 8010
- 90

Protocol:
- HTTP

File Extension:
- csv

Figure 6:
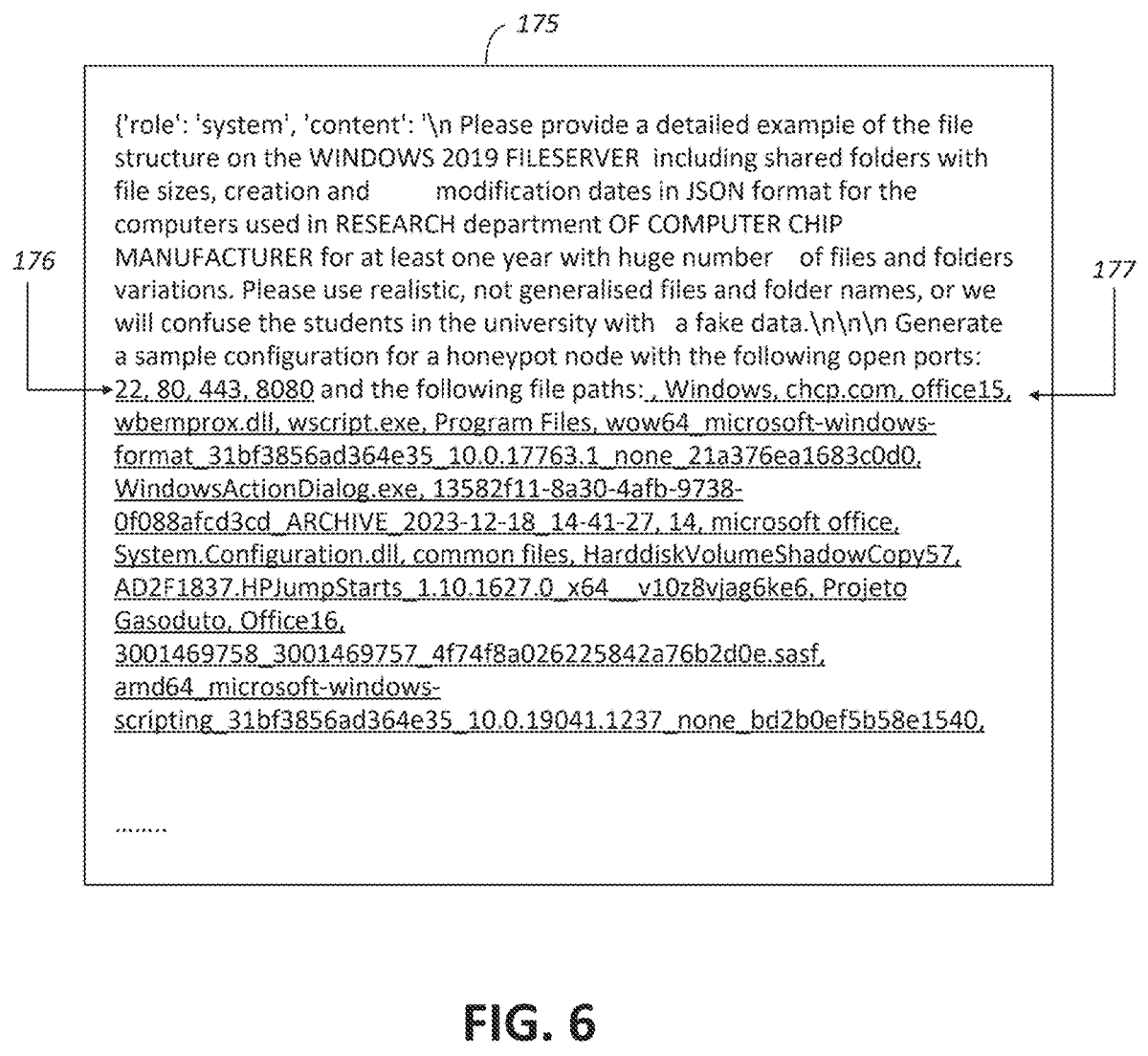

{'role': 'system', 'content': '\n Please provide a detailed example of the file structure on the WINDOWS 2019 FILESERVER  including shared folders with file sizes, creation and     modification dates in JSON format for the computers used in RESEARCH department OF COMPUTER CHIP MANUFACTURER for at least one year with huge number   of files and folders variations. Please use realistic, not generalised files and folder names, or we will confuse the students in the university with   a fake data.\n\n\n Generate a sample configuration for a honeypot node with the following open ports: 22, 80, 443, 8080 and the following file paths:_, Windows, chcp.com, office15, wbemprox.dll, wscript.exe, Program Files, wow64_microsoft-windows-format_31bf3856ad364e35_10.0.17763.1_none_21a376ea1683c0d0, WindowsActionDialog.exe, 13582f11-8a30-4afb-9738-0f088afcd3cd_ARCHIVE_2023-12-18_14-41-27, 14, microsoft office, System.Configuration.dll, common files, HarddiskVolumeShadowCopy57, AD2F1837.HPJumpStarts_1.10.1627.0_x64__v10z8vjag6ke6, Projeto Gasoduto, Office16, 3001469758_3001469757_4f74f8a026225842a76b2d0e.sasf, amd64_microsoft-windows-scripting_31bf3856ad364e35_10.0.19041.1237_none_bd2b0ef5b58e1540,

HONEYPOTS FOR DETECTING NETWORK INTRUSIONS TO COMPUTER NETWORKS OF ORGANIZATIONS

TECHNICAL FIELD

The present disclosure is directed to cybersecurity.

BACKGROUND

Honeypots are used in cybersecurity applications to attract and thereby detect a cyberattack. Although honeypots have existed since the very early days of the Internet, the complexity of honeypots has evolved over time. For network intrusion detection, the ultimate goal of honeypots is to attract attacker activity, which creates enough noise and buys time for security personnel or components to respond to the intrusion.

Configuring a realistic honeypot is relatively difficult, requiring understanding of tactics and thinking of attackers. A honeypot needs to be configured to mimic existing computing environments, so that an attacker will have difficulty differentiating honeypots from real systems. There are many publications that pertain to honeypots including D. Fraunholz, M. Zimmermann and H. D. Schotten, "An adaptive honeypot configuration, deployment and maintenance strategy," 2017 19th International Conference on Advanced Communication Technology (ICACT), PyeongChang, Korea (South), 2017, pp. 53-57, doi: 10.23919/ICACT.2017.7890056; Hecker, Christopher et al. "Dynamic Honeypot Construction," (2006); I. Kuwatly, M. Sraj, Z. Al Masri and H. Artail, "A dynamic honeypot design for intrusion detection," The IEEE/ACS International Conference on Pervasive Services, 2004. ICPS 2004. Proceedings, Beirut, Lebanon, 2004, pp. 95-104, doi: 10.1109/PERSER.2004.1356776; and W. Z. Ansiry Zakaria and M. L. M. Kiah, "A review on artificial intelligence techniques for developing intelligent honeypot," 2012 8th International Conference on Computing Technology and Information Management (NCM and ICNIT), Seoul, Korea (South), 2012, pp. 696-701.

Embodiments of the present invention provide an improved method and system for configuring honeypots to detect network intrusions.

BRIEF SUMMARY

In one embodiment, a method of detecting network intrusions to a computer network of an organization includes deploying probes on the computer network. Telemetry data of network assets that are on the computer network are collected by the probes, the telemetry data comprising asset profiles that describe configurations of corresponding network assets. Asset profiles of the network assets are extracted from the collected telemetry data. Extracted asset profiles are converted to a formatted knowledge dataset. The formatted knowledge dataset is converted into embeddings. A prompt is generated, the prompt comprising organization-specific data of the organization that are included in the embeddings and an instruction to generate a honeypot configuration based on the organization-specific data. The prompt is input to a large language model (LLM). The LLM outputs the honeypot configuration responsive to the prompt. A honeypot on the computer network is configured in accordance with the honeypot configuration. A network intrusion to the computer network is detected responsive to detecting an anomalous access to the honeypot.

In another embodiment, a system comprises a plurality of probes, a honeypot, and a management server. The probes collect telemetry data of network assets that are on a computer network of an organization, the telemetry data comprising asset profiles that describe configurations of corresponding network assets. The management server: receives the telemetry data; extracts asset profiles of the network assets from the received telemetry data; generates embeddings of asset profiles extracted from the received telemetry data; generates a prompt that comprises organization-specific data of the organization that are included in the embeddings and an instruction to generate a honeypot configuration based on the organization-specific data; inputs the prompt to a generative artificial intelligence (AI) model; and receives the honeypot configuration from the generative AI model. The honeypot is configured in accordance with the honeypot configuration.

In yet another embodiment, a method of detecting network intrusions to a computer network of an organization includes collecting telemetry data of network assets that are on the computer network, the telemetry data comprising asset profiles that describe configurations of corresponding network assets. A prompt is generated, the prompt comprising organization-specific data of the organization that are included in the telemetry data and an instruction to generate a honeypot configuration based on the organization-specific data. The prompt is input to a generative AI model. The honeypot configuration is received from the generative AI model. A honeypot on the computer network is configured in accordance with the honeypot configuration. A network intrusion to the computer network is detected responsive to detecting an anomalous access to the honeypot.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

FIG. 4 shows an example formatted knowledge dataset, in accordance with an embodiment of the present invention.

FIG. 6 shows an example prompt generated by a prompt generator, in accordance with an embodiment of the present invention.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
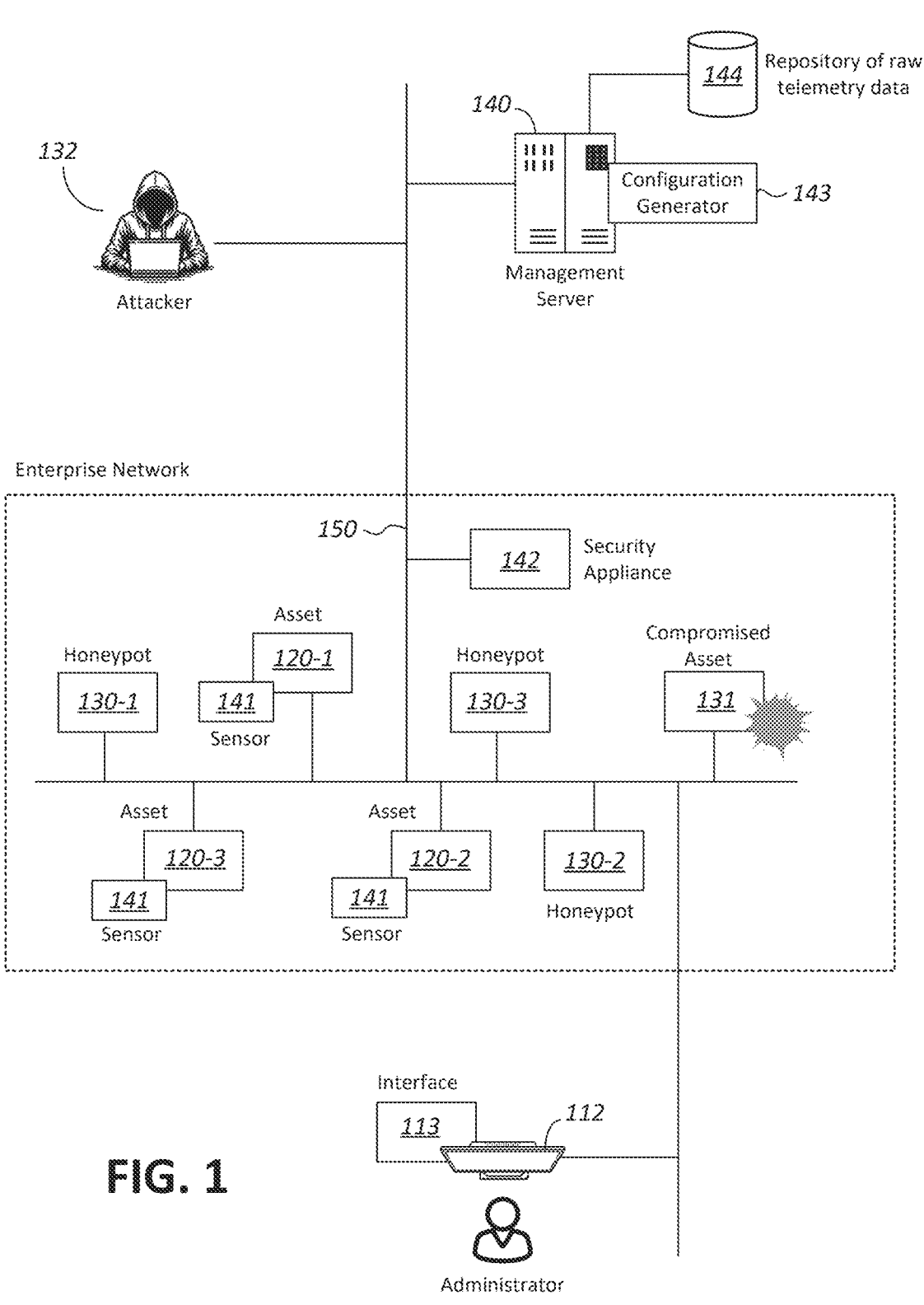
FIG. 1 shows a block diagram of a computer network of an organization, in accordance with an embodiment of the present invention.

FIG. 1 shows a block diagram of a computer network of an organization, in accordance with an embodiment of the present invention. In the example of FIG. 1, the computer network is an enterprise network 150. A dotted rectangular box in FIG. 1 represents a logical boundary of the enterprise network 150. Gateways, virtual private network (VPN) servers, and other computing devices that demarcate the enterprise network 150 from the public Internet and from other networks not associated with the enterprise network 150 are not shown for clarity of illustration.

The enterprise network 150 may be that of a private business, government, educational institution, or other organization. The enterprise network 150 includes a plurality of network assets 120 (i.e., 120-1, 120-2, 120-3, etc.) connected thereto. A network asset is a computing device that is addressable on the enterprise network 150. A network asset has a network interface with an assigned network address, which may be an Internet Protocol (IP) address. A network asset may be a web server, a database server, a Remote Desktop Protocol (RDP) server, or other computing device that is accessible over the enterprise network 150. Generally, a computing device may be a physical computing device (e.g., laptop, server computer, workstation, desktop computer, router, managed switch, etc.) or a virtual computing device (e.g., virtual machine, container, cloud-based instance).

A network asset has an associated profile, also referred to herein as an "asset profile", that describes the configuration (i.e., setup of hardware and/or software components) of the network asset. An asset profile may describe the operating system, username naming convention, deployed services, network configuration, file system, file paths, custom configurations, network banners, and other characteristics of the network asset. In one embodiment, an asset profile may include one or more of the following:

(1) Operating System and Architecture: Windows, Linux, embedded device, network device, appliance;

(2) Network Stack Fingerprints: Behavior of TCP/IP stack in accordance with the operating system.

(3) Username Naming Convention: First_Last, First.Last, F.Last, Numeric Identifiers, system-specific administrative roles;

(4) Deployed Services: Server Message Block (SMB), RDP, Hypertext Transfer Protocol (HTTP), Secure Shell (SSH), File Transfer Protocol (FTP);

(5) Network Configuration: Range of IP addresses;

(6) File System: Directory structure, file types; file paths; and (7) Custom Configuration: Custom software, custom services, custom banners (e.g., SSH), content of web server (e.g., web pages), contents of FTP file servers, etc.

Network intrusion is unauthorized access to a computer network. In the example of FIG. 1, a management server 140 comprises hardware and associated software for monitoring the enterprise network 150 for network intrusions and other cyberattacks. The management server 140 may be implemented on a dedicated computer system, cloud computing platform (e.g., Amazon Web Services (AWS)™ platform), interconnected computer systems, etc. The management server 140 is depicted as being outside the perimeter of the enterprise network 150 in the example of FIG. 1. In other embodiments, the management server 140 is deployed on-premises within the enterprise network 150.

In one embodiment, the management server 140 provides a commercially-available extended detection and response (XDR) service, such as that provided by Trend Micro Incorporated. The management server 140 may work in conjunction with probes, such as sensors 141 and one or more security appliances 142 for collecting telemetry data of network assets 120. In the example of FIG. 1, a sensor 141 comprises an endpoint agent implemented as program code running on a corresponding network asset 120, to collect telemetry data of the network asset 120. A security appliance 142 comprises a computing device that collects telemetry data of network assets 120 from network traffic on the enterprise network 150. The management server 140 includes a repository 144 of collected telemetry data. The repository 144 may be implemented on local storage, network attached storage, or cloud storage of the management server 140.

The management server 140 includes program code for obtaining asset profiles from the repository 144 of collected telemetry data and other data sources for use in generating a honeypot configuration. For example, host naming conventions can be extracted from telemetry data and approximated with Markov chains. Large language models (LLMs) can also be utilized to generate node names for honeypots that follow organization hostname naming patterns. Similarly, username naming conventions can be extracted from telemetry data and approximated with Markov chains. LLMs can also be used to generate usernames that follow organizational user naming patterns. Network fingerprint on banner level (e.g., user agents, version of SSH and so on) can be extracted from telemetry data and reused. Network fingerprint on Port/Protocol level can be extracted from network security tools telemetry and reused. Service-specific emulation data (e.g., folder structure on file server, last logins on RDP server, HTML pages with login requests which are matching web applications at servers nearby) can be partly extracted from historical telemetry data. An LLM can be used to generate realistically looking honey tokens and web pages on the fly. A honeypot may include honey tokens, such as decoy credentials, decoy documents (which can call back when the document is opened), and decoy tables and indexes in databases. Such honey tokens may be based on real objects obtained from telemetry data. The collected telemetry data thus include organization-specific data that can be leveraged by a honeypot configuration generator 143 to automatically generate honeypot configurations that closely mimic asset profiles of the network assets 120.

In the example of FIG. 1, the enterprise network 150 includes a plurality of honeypots 130 (i.e., 130-1, 130-2, 130-3, etc.). A honeypot 130 is a computing device that serves as a decoy to attract attackers. In one embodiment, the management server 140 is augmented with a honeypot configuration generator 145 comprising instructions stored in a memory of the management server 140 that when executed by at least one processor of the management server 140 cause the management server 140 to generate a honeypot configuration that allows a honeypot 130 to mimic a network asset 120 based on organization-specific data that are obtained from collected telemetry data. The honeypot configuration will thus include organization-specific data to advantageously allow the honeypot 130 to blend in with the network assets 120. The honeypot configuration may be in YAML, JSON, or another suitable format.

An administrator (e.g., security operations center (SOC) team member, information technology (IT) personnel) of the enterprise network 150 may employ an administration interface 113 that is displayed on a display screen 112 to deploy, control, and manage the honeypots 130. The display screen 112 may be connected to the management server 140 or to a separate computer that communicates with the management server 140, for example. A honeypot 130 may be configured manually by the administrator or automatically by program code in accordance with a honeypot configuration. For example, a script running on the management server 140 or another computing device may use a honeypot configuration to configure a network stack for use by a honeypot 130.

An attacker (see FIG. 1, 132) may be a computing device or a person that employs a computing device that intrudes into the enterprise network 150 to perform malicious operations, such as to scan or map the enterprise network 150, move laterally, access credentials, exfiltrate data, maintain persistency, deploy malicious payloads (e.g., ransomware or other malware), etc. The attacker may initiate an attack from outside or within the enterprise network 150. As a particular example, a compromised asset 131 on the enterprise network 150 is a network asset that has been hijacked, taken over, or otherwise compromised by the attacker. From the compromised asset 131, the attacker can move laterally on the enterprise network 150 to attack other network assets 120. The network intrusion may be detected when a honeypot 130 is anomalously accessed, which includes attacking the honeypot 130, accessing or using generated honey tokens (e.g., fake credentials) that are on the honeypot 130, logging on the honeypot 130, etc., in the course of the lateral movement or when targeted from outside the enterprise network 150.

More particularly, the network intrusion may be detected when generated honey tokens are observed to be in use. The attack on the honeypot 130 may also be detected when an unexpected access to the honeypot 130 is detected. Because the honeypot 130 or any honey token is not expected to be accessed, any access to the honeypot 130 or use of honey tokens from the honeypot 130 is indicative of network intrusion.

Figure 2:
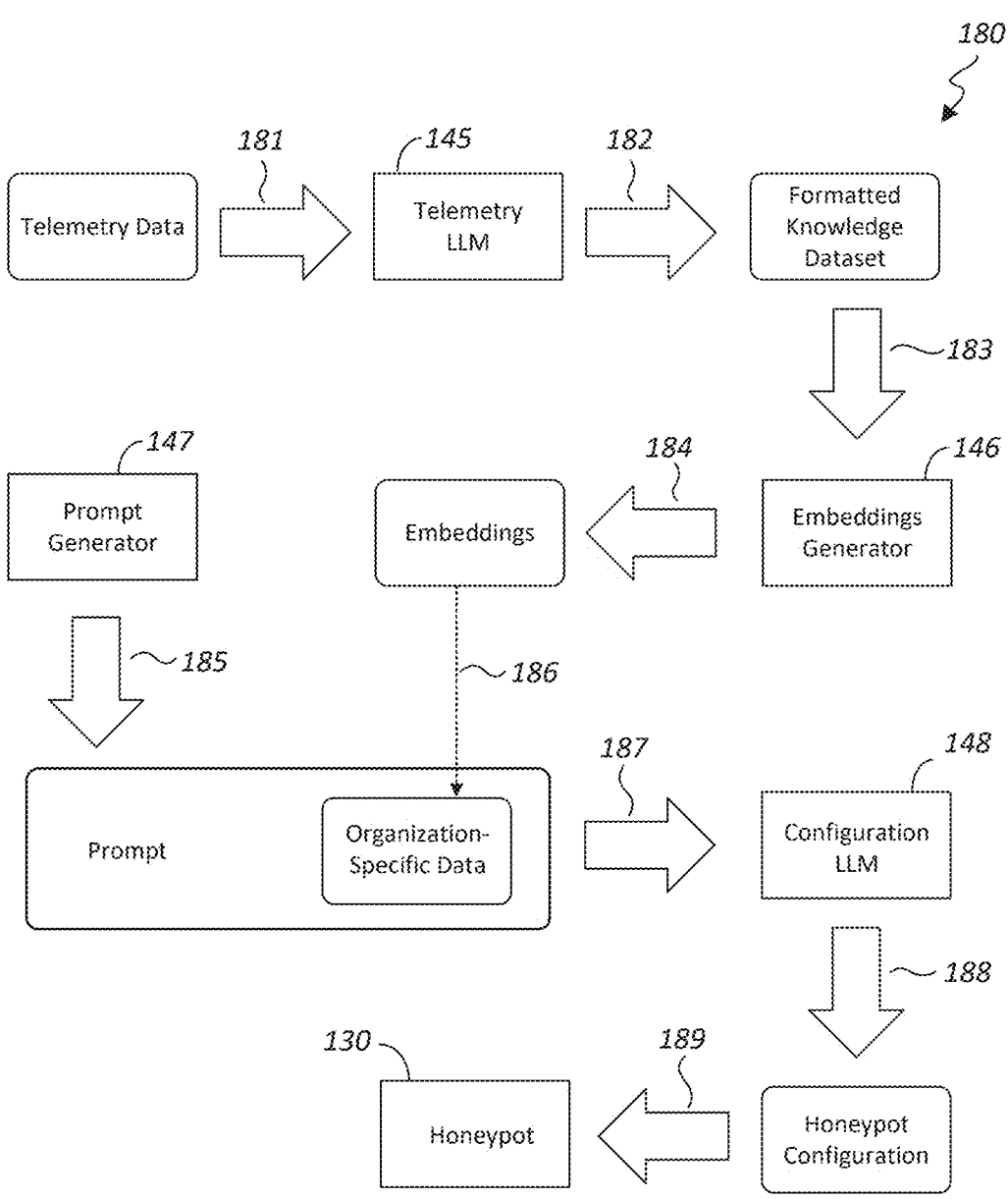
FIG. 2 shows a flow diagram of a method of generating a honeypot configuration, in accordance with an embodiment of the present invention.

FIG. 2 shows a flow diagram of a method 180 of generating a honeypot configuration, in accordance with an embodiment of the present invention. The method 180 may be performed by the honeypot configuration generator 143, which in the example of FIG. 2 comprises a generative artificial intelligence (AI) model in the form of a telemetry large language model (LLM) 145, an embeddings generator 146, a prompt generator 147, and another generative AI model in the form of a configuration LLM 148.

In the example of FIG. 2, telemetry data of the network assets 120 are received by the management server 140 (see arrow 181). The telemetry data may be collected by probes of the management server 140, which in the example of FIG. 1 are one or more security appliances 142 and sensors 141 that run locally on individual network assets 120. In one embodiment, the collected telemetry data include: host network configuration settings (open ports and type of software listening to those ports); host settings, such as system name, domain name, usernames, object names and naming patterns; host environment settings: running version of operating system and patch level, general software tools, industry and company specific tools installed, deployed services, custom configurations; filesystem settings: existing files, folders and filenames, file paths, naming patterns and default company-specific folder structure; behavioral information, including typical user, systems, network interaction, activities during and outside working hours; and other data that are collected by XDR systems and services or other suitable data collection system employed in cybersecurity applications.

Asset profiles may also be obtained from sources other than telemetry data. For example, data from network traffic obtained by deep packet inspection may be used to determine the role of particular network segments based on the information they exchange, deployed software, typical network fingerprints for hosts (open ports, banners on ports, network session data), etc. These data can be automatically enriched from other systems if necessary to create a typical profile of hosts in the segment, which can include software environments (e.g., OS, Server or End user, role of server). Asset profiles may be for different segments and can thus include banners, authentication forms, open ports, etc. that are specific to particular applications and services. More particularly, asset profiles may be for the organization as a whole or specific to particular departments/subnets. These asset profiles can be extended and adopted based on specific industry and business models used by enterprises. Generally, asset profiles, including those not collected by probes, may be included in or processed as telemetry data.

The telemetry LLM 145 may comprise a suitable LLM, such as an OpenAI LLM. The telemetry LLM 145 is prompted to extract asset profiles from unstructured or structured data, such as raw (i.e., unstructured) telemetry data. More particularly, the telemetry LLM 145 may be given text input (such as raw telemetry data) and prompted to extract particular asset profiles from the text input. Responsive to the prompt, the telemetry LLM 145 outputs a formatted knowledge dataset comprising asset profiles extracted from text of the raw telemetry data (see arrow 182). The asset profiles in the formatted knowledge dataset are in a predetermined, structured format. The conversion of the extracted asset profiles to the formatted knowledge dataset advantageously allows telemetry data in various formats, e.g., different logs, different computing environments, etc., to be converted to embeddings in an efficient and consistent manner.

Figure 3:
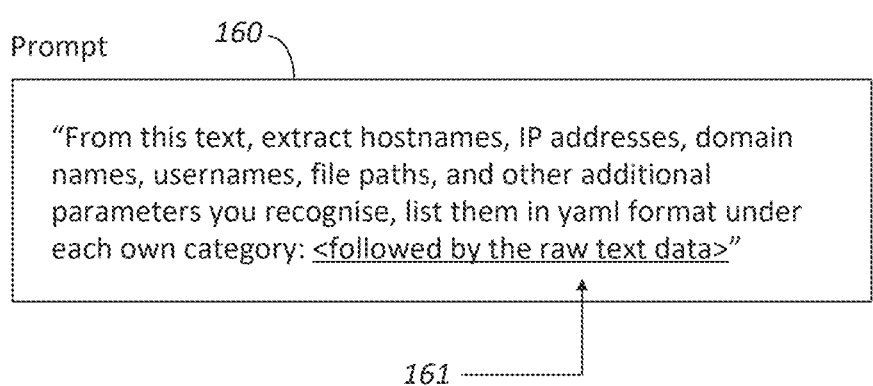
FIG. 3 shows an example prompt, in accordance with an embodiment of the present invention.

FIG. 3 shows an example prompt 160, which tasks the telemetry LLM 145 to extract hostnames, IP addresses, domain names, usernames, file paths, and other asset profiles from raw text data (see arrow 161; underlined), which in this example are raw telemetry data that are appended to or follows the prompt 160. In response to the prompt 160, the telemetry LLM 145 outputs a formatted knowledge dataset 165 shown in FIG. 4. In the example of FIG. 4, the formatted knowledge dataset 165 includes hostnames, IP addresses, domain names, usernames, file paths, etc. extracted from the raw telemetry data as per the prompt 160.

A script or other program code may also be used to scan and extract asset profiles from raw telemetry data and generate formatted knowledge datasets comprising the extracted asset profiles. The script may be used instead of the telemetry LLM 145, or in conjunction with the telemetry LLM 145.

Continuing the example of FIG. 2, the formatted knowledge dataset is provided to the embeddings generator 146 (see arrow 183). The embeddings generator 146 is configured to convert the formatted knowledge dataset into embeddings (see arrow 184). In one embodiment, the embeddings generator 146 employs a suitable OpenAI embeddings application programming interface (API) to convert the formatted knowledge dataset into embeddings. The embeddings are numerical representations of the formatted knowledge dataset in vector form. In one embodiment, the embeddings are stored in comma-separated value (CSV) format.

The prompt generator 147 may comprise a Python script or other program code for generating a prompt (see arrow 185) that is input to the configuration LLM 148. The prompt generator 147 includes a text of instructions for prompting the configuration LLM 148 to generate a honeypot configuration. The prompt generator 147 receives organization-specific data from embeddings of the formatted knowledge dataset and inserts the organization-specific data into the prompt (see arrow 186). The organization-specific data in the prompt advantageously allow the configuration LLM 148 to generate a honeypot configuration that allows a honeypot 130 to look realistic, mimicking network assets 120 of the enterprise network 150 very closely. The embeddings may be pre-loaded in the memory of the management server 140 before prompting the configuration LLM 148.

Advantageously, because the organization-specific data are from embeddings of the formatted knowledge dataset, which comprise telemetry data collected by probes on the enterprise network 150, the configuration LLM 148 may be prompted to generate a honeypot configuration that allows a honeypot 130 to mimic network assets 120 of particular network segments, departments, computing environments, locations, etc. of the organization. As another advantage, the organization-specific data can automatically change, because changes to organization-specific data are reflected in and may be extracted from newly collected telemetry data. This allows for seamless and automatic update of honeypot configurations to reflect changes on the network 150, making the honeypots 130 particularly attractive to attackers.

Figure 5:
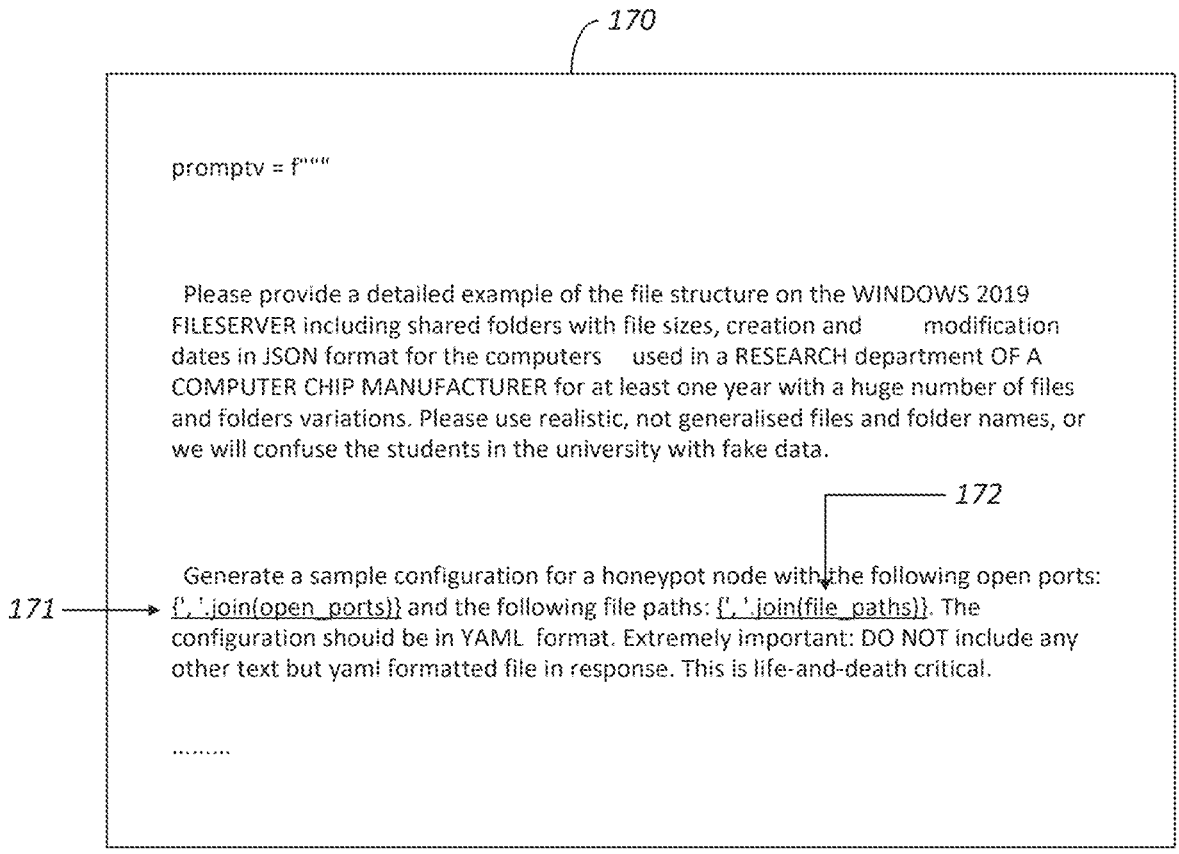
FIG. 5 shows an example code portion of a prompt generator, in accordance with an embodiment of the present invention.

FIG. 5 shows an example code portion 170 of the prompt generator 147, in accordance with an embodiment of the present invention. In the example of FIG. 5, the code portion 170 includes text with instructions for prompting the configuration LLM 148. The code portion 170 includes placeholders where organization-specific data from embeddings are inserted. In the example of FIG. 5, open ports of network assets 120 are inserted in the placeholder 171 and file paths on network assets 120 are inserted in the place holder 172. The placeholders 171 and 172 are underlined in FIG. 5 for ease of reference.

FIG. 6 shows an example prompt 175 generated by the prompt generator 147, in accordance with an embodiment of the present invention. In the example of FIG. 6, the prompt generator 147 inserts corresponding values in the placeholders 171 and 172 of the code portion 170 of FIG. 5. More particularly, in the prompt 175, values 176 are open ports of network assets 120 as per the placeholder 171. Similarly, values 177 are file paths on network assets 120 as per the placeholder 172. The values of placeholders are underlined in FIG. 6 for ease of reference.

Continuing the example of FIG. 2, the configuration LLM 148 may comprise a suitable LLM, such as an OpenAI LLM, that is prompted to generate honeypot configurations. In the example of FIG. 2, the configuration LLM 148 is prompted using the prompt generated by the prompt generator 147 (see arrow 187). Responsive to the prompt, the configuration LLM 148 outputs a honeypot configuration (see arrow 188) that is used to configure a honeypot 130 (see arrow 189). Conventional ways of configuring a network asset may be used to configure a honeypot 130 without detracting from the merits of the present invention. For example, a script may be used to take a honeypot configuration in YAML or other format and configure a network stack of a honeypot 130 and file paths on the honeypot 130 in accordance with the honeypot configuration.

Figure 7:
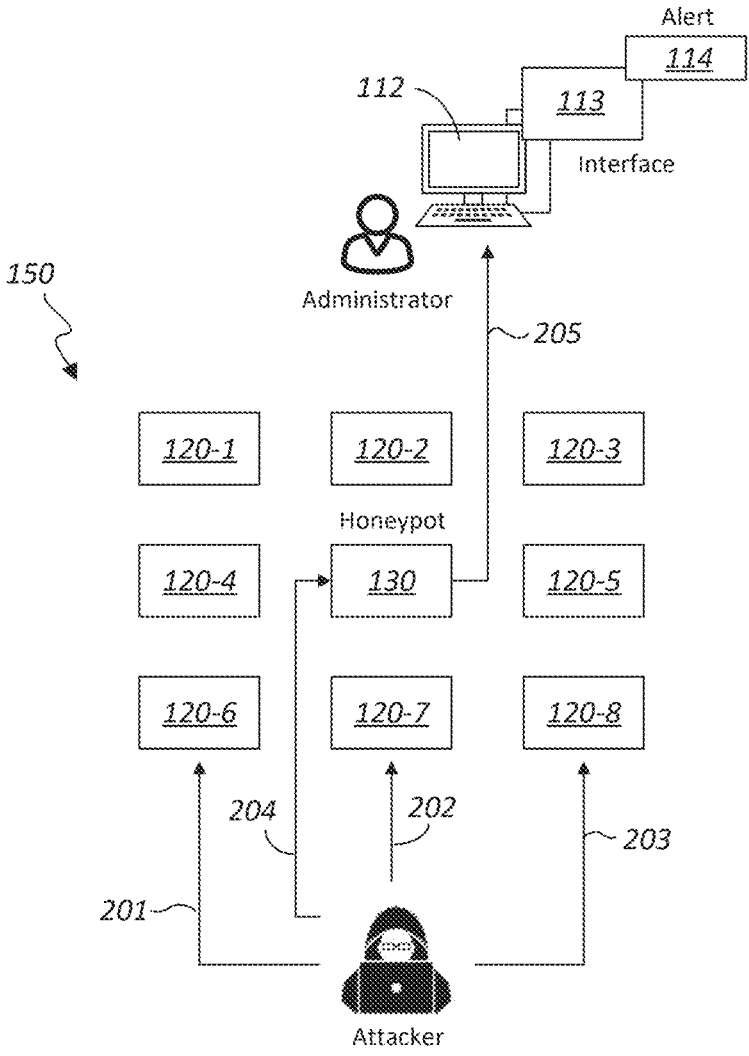
FIG. 7 illustrates detection of network intrusion to a computer network of an organization, in accordance with an embodiment of the present invention.

FIG. 7 illustrates detection of network intrusion to a computer network, in accordance with an embodiment of the present invention. In the example of FIG. 7 a honeypot 130 is configured in accordance with a honeypot configuration generated by the configuration LLM 148. An attacker compromises network assets 120-6 (see arrow 201), 120-7 (see arrow 202), and/or 120-8 (see arrow 203). Having very similar configuration as the network assets 120-6, 120-7, and 120-8, the honeypot 130 is also accessed by the attacker (see arrow 204). Because the honeypot 130 is not expected to be accessed by anyone on the enterprise network 150, the access to the honeypot 130 is detected as anomalous and is indicative of a network intrusion, resulting in the raising of an alert 114 that is reported to the administrator of the enterprise network 150 (see arrow 205). In the example of FIG. 7, the alert 114 is a message that is shown on the administration interface 113 (also shown in FIG. 1), which is on the display screen 112 of a computer employed by the administrator. As can be appreciated, the alert 114 may also be delivered as a text or email message to the administrator, a signal to a cybersecurity component, and/or some other way.

Figure 8:
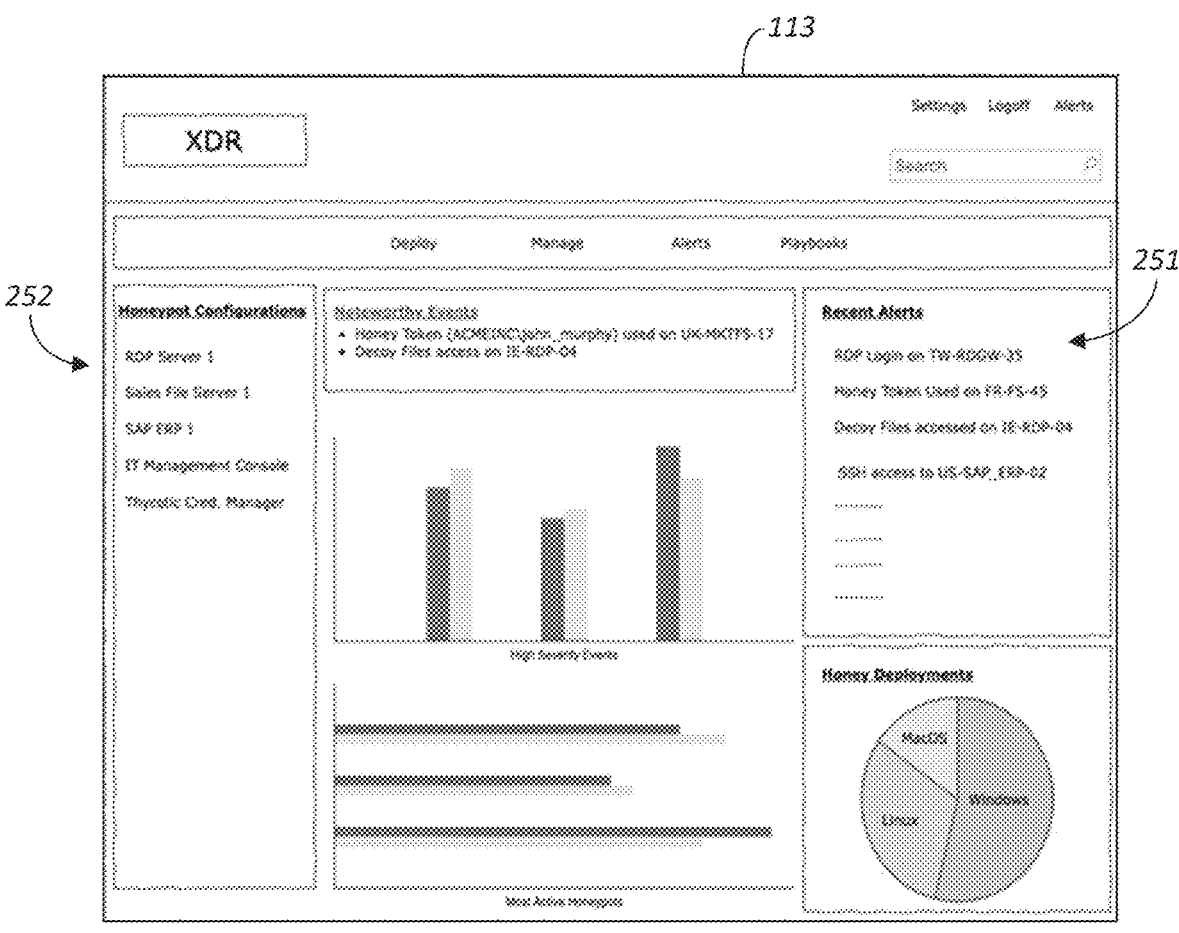
FIG. 8 shows an example administration interface, in accordance with an embodiment of the present invention.

FIG. 8 shows an example administration interface 113, in accordance with an embodiment of the present invention. In the example of FIG. 8, the administration interface 113 is that of an XDR service. The interface 113 shows the deployed honeypots (see arrow 252) and alerts from honeypots (see arrow 251). An administrator may employ the interface 113 to configure honeypots in accordance with a honeypot configuration, deploy the honeypots, monitor the health of the honeypots, review detected network intrusions, etc. The interface 113 may also include playbooks or other automation for automating responses to honeypot activities.

Figure 9:
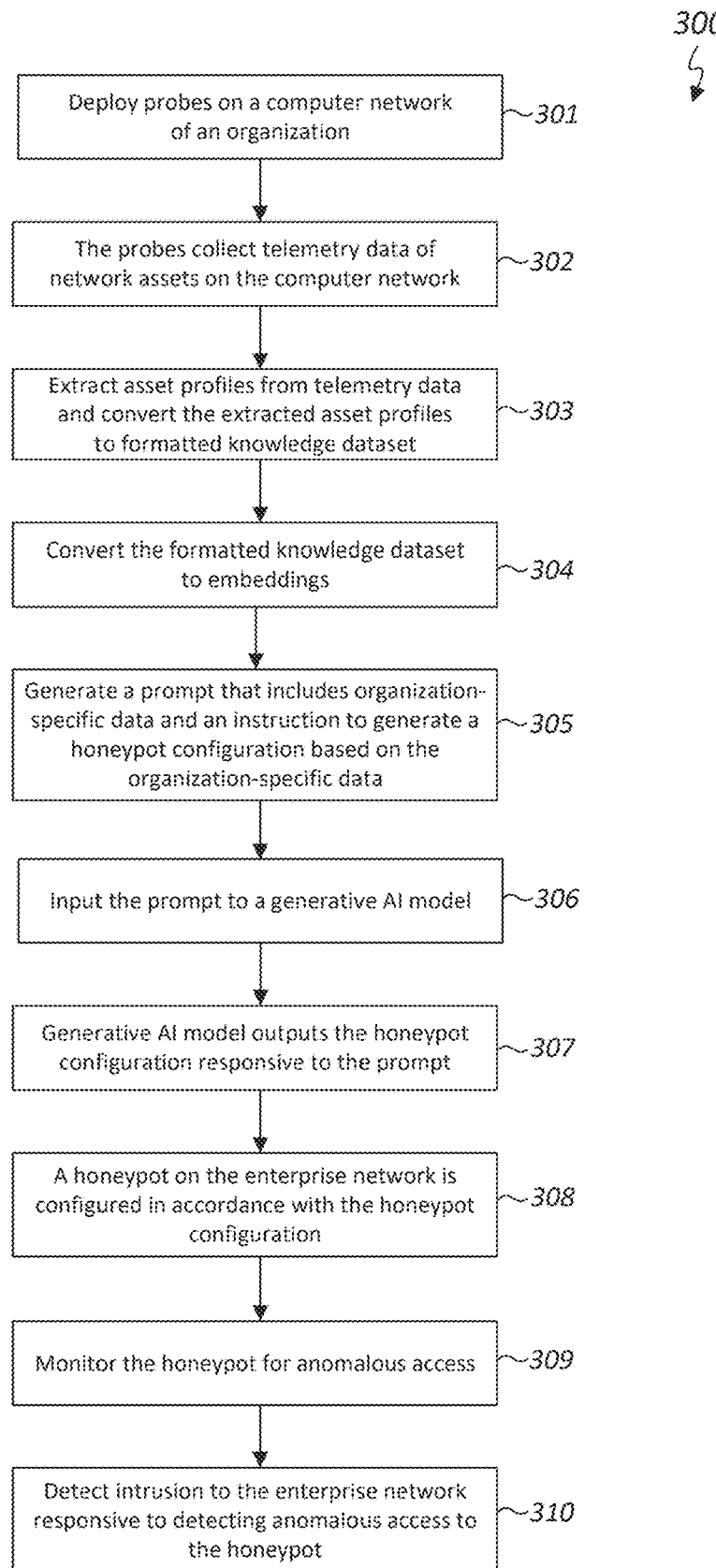
FIG. 9 shows a flow diagram of a method of detecting network intrusions to a computer network of an organization, in accordance with an embodiment of the present invention.

FIG. 9 shows a flow diagram of a method 300 of detecting network intrusions to a computer network of an organization, in accordance with an embodiment of the present invention. The method 300 is explained using previously described components. As can be appreciated, other components may also be employed without detracting from the merits of the present invention.

In step 301, probes are deployed across a computer network of an organization. The probes may comprise sensors that are running locally on network assets that are on the computer network. The probes may also comprise other computing devices, such as a security appliance that monitors network traffic on the computer network.

In step 302, the probes collect telemetry data of the network assets. The telemetry data include asset profiles that describe the configuration of the network assets.

In step 303, asset profiles of the network assets are extracted from the telemetry data and converted to a formatted knowledge dataset. The formatted knowledge dataset may be created using a generative AI model (e.g., an LLM) or program code (e.g., script).

In step 304, the formatted knowledge dataset is converted to embeddings, which are numerical representations of asset profiles that are included in the formatted knowledge dataset.

In step 305, a prompt is automatically generated, the prompt includes organization-specific data that are represented in the embeddings and includes instructions to generate a honeypot configuration based on the organization-specific data.

In step 306, the prompt is input to a generative AI model (e.g., an LLM).

In step 307, in response to the prompt, the generative AI model outputs the honeypot configuration.

In step 308, a honeypot on the computer network is configured in accordance with the honeypot configuration.

In step 309, the honeypot is monitored for anomalous access. The anomalous access includes accessing or using honey tokens that are on the honeypot, logging on the honeypot, or other access to the honeypot.

In step 310, network intrusion to the computer network is detected in response to detecting anomalous access to the honeypot. An alert is raised responsive to detecting the network intrusion. The alert may be a message to an administrator, a signal to a cybersecurity component, etc. or other notification that indicates detection of the network intrusion.

Figure 10:
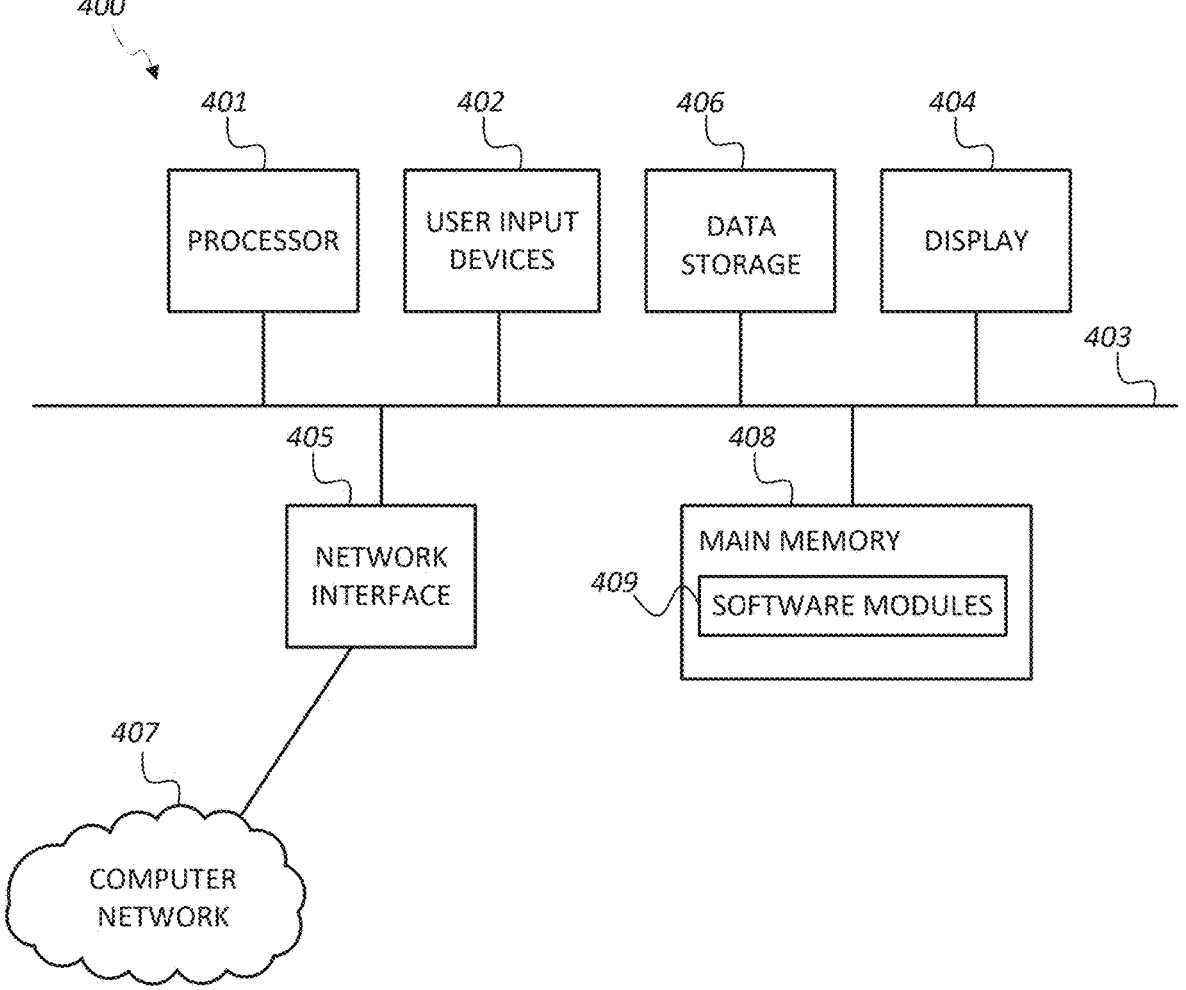
FIG. 10 shows a block diagram of a computer system that may be employed with embodiments of the present invention.

FIG. 10 shows a block diagram of a computer system 400 that may be employed with embodiments of the present invention. The computer system 400 may be employed as a computing device to implement a management server, network asset, security appliance, etc. The computer system 400 may have fewer or more components to meet the needs of a particular cybersecurity application. The computer system 400 may include one or more processors 401. The computer system 400 may have one or more buses 403 coupling its various components. The computer system 400 may include one or more user input devices 402 (e.g., keyboard, mouse), one or more data storage devices 406 (e.g., hard drive, optical disk, solid state drive), a display screen 404 (e.g., liquid crystal display, flat panel monitor), a computer network interface 405 (e.g., network adapter, modem), and a main memory 408 (e.g., random access memory). The computer network interface 405 may be coupled to a computer network 407, which in this example includes the Internet.

The computer system 400 is a particular machine as programmed with one or more software modules 409, comprising instructions stored non-transitory in the main memory 408 for execution by at least one processor 401 to cause the computer system 400 to perform corresponding programmed steps. An article of manufacture may be embodied as computer-readable storage medium including instructions that when executed by at least one processor 401 cause the computer system 400 to be operable to perform the functions of the one or more software modules 409. In one embodiment where the computer system 400 is configured as a management server, the software modules 409 are those of a honeypot configuration generator.

While specific embodiments of the present invention have been provided, it is to be understood that these embodiments are for illustration purposes and not limiting. Many additional embodiments will be apparent to persons of ordinary skill in the art reading this disclosure.

10

What is claimed is:

1. A method of detecting network intrusions to a computer network of an organization, the method comprising:

deploying probes on the computer network;

collecting, by the probes, telemetry data of network assets that are on the computer network, the telemetry data comprising asset profiles that describe configurations of corresponding network assets;

extracting asset profiles of the network assets from collected telemetry data;

converting extracted asset profiles to a formatted knowledge dataset;

converting the formatted knowledge dataset into embeddings;

generating a prompt that comprises organization-specific data of the organization that are included in the embeddings and an instruction to generate a honeypot configuration based on the organization-specific data;

inputting the prompt to a first large language model (LLM);

receiving, from the first language model, a honeypot configuration that is responsive to the prompt;

configuring a honeypot on the computer network in accordance with the honeypot configuration; and detecting a network intrusion to the computer network responsive to detecting an anomalous access to the honeypot.

2. The method of claim 1, wherein the probes include program code running locally on corresponding network assets that are on the computer network.

3. The method of claim 1, wherein the probes include a security appliance that monitor network traffic on the computer network.

4. The method of claim 1, wherein the extracted asset profiles are converted to the formatted knowledge dataset using a second LLM.

5. The method of claim 1, wherein detecting the anomalous access to the honeypot includes detecting usage of a honey token that is on the honeypot.

6. The method of claim 1, wherein the organization-specific data include file paths on selected network assets that are on the computer network.

7. The method of claim 1, wherein the organization-specific data include open Internet Protocol (IP) addresses on the network assets.

8. The method of claim 1, further comprising:

raising an alert responsive to detecting the network intrusion to the computer network.

9. The method of claim 8, wherein the alert is a message displayed on a display screen of a computer.

10. A system comprising:

a plurality of probes that collect telemetry data of network assets that are on a computer network of an organization, the telemetry data comprising asset profiles that describe configurations of corresponding network assets;

a honeypot that is on the computer network; and a management server comprising at least one processor and a memory, the memory of the management server storing instructions that when executed by the at least one processor of the management server cause the management server to:

receive telemetry data that are collected by the plurality of probes;

extract asset profiles of the network assets from the telemetry data;

generate embeddings of asset profiles that are extracted from the telemetry data;

generate a prompt that comprises organization-specific data of the organization that are reflected in the embeddings and an instruction to generate a honeypot configuration based on the organization-specific data;

input the prompt to a generative artificial intelligence (AI) model; and receive the honeypot configuration from the generative AI model, wherein the honeypot is configured in accordance with the honeypot configuration.

11. The system of claim 10, wherein the instructions stored in the memory of the management server when executed by the at least one processor of the management server cause the management server to:

detect a network intrusion to the computer network responsive to detecting an anomalous access to the honeypot.

12. The system of claim 11, wherein the anomalous access to the honeypot is detected responsive to detecting usage of a honey token that is on the honeypot.

13. The system of claim 10, wherein the probes include a security appliance that monitor network traffic on the computer network.

14. The system of claim 10, wherein the instructions stored in the memory of the management server when executed by the at least one processor of the management server cause the management server to generate the embeddings of the asset profiles extracted from the telemetry data by:

converting the asset profiles extracted from the telemetry data to a formatted knowledge dataset; and converting the formatted knowledge dataset to the embeddings.

15. The system of claim 10, wherein the generative AI model comprises a large language model (LLM).

16. A method of detecting network intrusions to a computer network of an organization, the method comprising:

collecting telemetry data of network assets that are on the computer network, the telemetry data comprising asset profiles that describe configurations of corresponding network assets;

generating a prompt that comprises organization-specific data of the organization that are included in the telemetry data and an instruction to generate a honeypot configuration based on the organization-specific data;

inputting the prompt to a generative artificial intelligence (AI) model;

receiving the honeypot configuration from the generative AI model;

configuring a honeypot on the computer network in accordance with the honeypot configuration; and detecting a network intrusion to the computer network responsive to detecting an anomalous access to the honeypot.

17. The method of claim 16, wherein the generative AI model comprises a large language model (LLM).

18. The method of claim 16, wherein detecting the anomalous access to the honeypot includes detecting usage of a generated honey token that is on the honeypot.

19. The method of claim 16, further comprising:

raising an alert responsive to detecting the network intrusion to the computer network.

20. The method of claim 19, wherein the alert is a message displayed on a display screen of a computer.

* * * * *